US011271726B2

(12) United States Patent
Xu (10) Patent No.: US 11,271,726 B2
(45) Date of Patent: Mar. 8, 2022

(54) KEY ENCRYPTION METHODS, APPARATUSES, AND SYSTEMS

(71) Applicant: Alibaba Group Holding Limited, Grand Cayman (KY)

(72) Inventor: Suhang Xu, Zhejiang (CN)

(73) Assignee: Alibaba Group Holding Limited, George Town (KY)

( * ) Notice: Subject to any disclaimer, the term of this patent is extended or adjusted under 35 U.S.C. 154(b) by 206 days.

(21) Appl. No.: 16/570,392

(22) Filed: Sep. 13, 2019

(65) Prior Publication Data

US 2020/0007320 A1 Jan. 2, 2020

Related U.S. Application Data

(63) Continuation of application No. PCT/CN2018/077817, filed on Mar. 2, 2018.

(30) Foreign Application Priority Data

Mar. 15, 2017 (CN) .......................... 201710153405.2

(51) Int. Cl.
*H04L 9/08* (2006.01)
*H04L 9/00* (2022.01)
*H04L 9/14* (2006.01)

(52) U.S. Cl.
CPC ............ *H04L 9/0822* (2013.01); *H04L 9/002* (2013.01); *H04L 9/0869* (2013.01); *H04L 9/0894* (2013.01); *H04L 9/14* (2013.01)

(58) Field of Classification Search
CPC ... H04L 9/00; H04L 29/06; H04L 9/08; H04L 9/14; H04L 9/002; H04L 9/0869;
(Continued)

(56) References Cited

U.S. PATENT DOCUMENTS 6,754,450 B2 * 6/2004 Chang ................ H04Q 11/0062
370/390
6,947,556 B1 9/2005 Matyas, Jr. et al.
(Continued)

FOREIGN PATENT DOCUMENTS

CN 101951315 A 1/2011
CN 102457561 A 5/2012
(Continued)

OTHER PUBLICATIONS

Translated Second Office Action from The State Intellectual Property Office of the People's Republic of China for Application No. CN 201710153405.2, dated Apr. 2, 2021, a counterpart foreign application of U.S. Appl. No. 16/570,392, 8 pgs.
(Continued)

*Primary Examiner* — Thanhnga B Truong
(74) *Attorney, Agent, or Firm* — Lee & Hayes, P.C.

(57) ABSTRACT

Key encryption methods, apparatuses and systems are disclosed in the embodiments of the present disclosure. A client does not store an encryption algorithm used for encrypting a key, but only stores an information header encrypted by the encryption algorithm, so that an attacker cannot directly obtain the encryption algorithm that is used for decrypting the information header even if the client is attacked, thus improving the security of the key in the client. When the key is needed to be used to encrypt obtained data, the client can use the stored first information header to request the key from the server, and the server having a higher security restores the key based on a stored first encryption algorithm. The client can encrypt the data using the key obtained from the server, so that the client can ensure the security of the obtained data without storing the encryption algorithm.

20 Claims, 6 Drawing Sheets

(58) Field of Classification Search
CPC ... H04L 9/0822; H04L 63/062; H04L 9/0894; H04L 9/32; H04L 9/0866; H04L 9/3231; H04L 9/28; H04L 9/088; H04L 9/065; G11B 20/00086; G11B 20/0021; H04N 5/913; H04N 7/162; H04N 7/17345; H04N 21/2347; H04N 21/631; H04N 21/63345; H04N 7/1675; G06F 21/00

See application file for complete search history.

(56) References Cited

U.S. PATENT DOCUMENTS

| | | | |
|---|---|---|---|
| 7,010,689 B1 | 3/2006 | Matyas, Jr. et al. | |
| 7,096,355 B1 | 8/2006 | Marvit et al. | |
| 7,360,096 B2 | 4/2008 | Bracewell et al. | |
| 7,376,835 B2 | 5/2008 | Olkin et al. | |
| 7,421,082 B2 * | 9/2008 | Kamiya | G11B 20/00086 348/E7.056 |
| 7,716,481 B2 * | 5/2010 | Yami | H04L 9/32 713/170 |
| 8,254,571 B1 * | 8/2012 | Boyen | H04L 9/08 380/44 |
| 8,601,263 B1 | 12/2013 | Shankar et al. | |
| 8,898,464 B2 | 11/2014 | Bono et al. | |
| 9,166,787 B2 | 10/2015 | Nord et al. | |
| 2005/0198170 A1 | 9/2005 | LeMay et al. | |
| 2012/0204032 A1 | 8/2012 | Wilkins et al. | |
| 2013/0044878 A1 | 2/2013 | Rich et al. | |
| 2015/0281185 A1 | 10/2015 | Cooley | |

FOREIGN PATENT DOCUMENTS

| | | |
|---|---|---|
| CN | 102726028 A | 10/2012 |
| CN | 103220295 A | 7/2013 |
| CN | 103259651 A | 8/2013 |
| CN | 103916359 A | 7/2014 |

OTHER PUBLICATIONS

Translation of Search Report dated Mar. 26, 2021, from corresponding CN Patent Application No. 201710153405.2, 1 page.
The Extended European Search Report dated Dec. 14, 2020 for European Patent Application No. 18768548.2, 9 pages.
Popper et al., "Keeping Data Secret under full Compromise using Porter Devices", Proceedings of the 26th Annual Computer Security Applications Conference, Dec. 6-10, 2010, Austin, Texas, Dec. 6, 2010, pp. 241-250.
Translation of CN Office Action from Corresponding CN Application No. 201710153405.2 dated Jun. 30, 2020, a counterpart foreign application for U.S. Appl. No. 16/570,392 , 11 pages.
Translation of International Search Report for corresponding PCT Application PCT/CN2018/077817, dated May 23, 2018, a counterpart foreign application for U.S. Appl. No. 16/570,392 , 2 pages.
Translation of Written Opinion for corresponding PCT Application PCT/CN2018/077817, dated May 23, 2018, a counterpart foreign application for U.S. Appl. No. 16/570,392 , 4 pages.
Translation of CN Search Report from Corresponding CN Application No. 201710153405.2 dated Jun. 20, 2020, a counterpart foreign application for U.S. Appl. No. No. 16/570,392 , 1 page.

* cited by examiner

KEY ENCRYPTION METHODS, APPARATUSES, AND SYSTEMS

CROSS REFERENCE TO RELATED PATENT APPLICATIONS

This application claims priority to and is a continuation of PCT Patent Application No. PCT/CN2018/077817 filed on 2 Mar. 2018, and is related to and claims priority to Chinese Application No. 201710153405.2, filed on 15 Mar. 2017 and entitled "Key Encryption Methods, Apparatuses, and Systems," which are hereby incorporated by reference in its entirety.

TECHNICAL FIELD

The present disclosure relates to the field of data processing, and particularly to key encryption methods, apparatuses, and systems.

BACKGROUND

In order to ensure data security of a client, data obtained by the client needs to be encrypted by a key and then locally stored in the client. If the client is attacked, since data obtained by the attacker is encrypted, the data cannot be used directly.

In conventional methods, a key of a client is generated by the client itself. In order to improve the security of the key, the client generally encrypts the key through an encryption algorithm, and then stores the encrypted key locally in the client. When the key is needed for encrypting data, the key can be restored from the encrypted key according to the encryption algorithm that is stored locally.

However, since the encryption algorithm is stored locally in the client, it is easily obtained by an attacker, so that the attacker can restore the key from the encrypted key using the encryption algorithm, thereby cracking encrypted data stored in the client based on the key.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

In order to solve the above technical problems, embodiments of the present disclosure provides key encryption methods, apparatuses, and systems, which do not need to store an encryption algorithm in a client, and improve the security of a key in the client.

The embodiments of the present disclosure disclose the following technical solutions.

In implementations, the present disclosure provides a key encryption system, wherein the system includes a client and a server.

The client is configured to send a first information header used for requesting to obtain a key to the server, wherein the key is a key used by the client to encrypt data obtained by the client, the first information, and the first information header is obtained by the server after encrypting the key using a first encryption algorithm; and obtain a second information header and the key from the server, wherein the second information header is obtained by the server after encrypting the key based on a second encryption algorithm.

The server is configured to obtain the first information header used for requesting to obtain the key from the client; restore the key from the first information header based on the first encryption algorithm; encrypting the key based on the second encryption algorithm to obtain the second information header; and transmitting the second information header and the key to the client.

In implementations, the present disclosure provides a key encryption method, and the method includes:

a client sending a first information header used for requesting to obtain a key to a server, wherein the key is a key used by the client to encrypt data obtained by the client, and the first information header is obtained by the server after encrypting the key using a first encryption algorithm; and the client obtaining a second information header and the key from the server, and the second information header is obtained by the server after encrypting the key based on a second encryption algorithm.

In implementations, before the client sending the first information header used for requesting to obtain the key to the server, the method further includes:

the client determining whether an information header is stored locally;

the client sending a key acquisition request to the server if not stored;

the client obtaining the first information header and the key from the server; and the client storing the first information header locally.

In implementations, the client determining whether the information header is stored locally includes:

if the information header is stored, the client using the stored information header as the first information header, and performing an operation of sending the first information header used for requesting to obtain the key to the server.

In implementations, after the client obtains the second information header and the key from the server, the method further includes:

the client storing the second information header locally and deleting the first information header locally.

In implementations, the first encryption algorithm is different from the second encryption algorithm.

In implementations, the method includes:

the client storing the key in a memory.

In implementations, the present disclosure provides a key encryption apparatus, wherein the apparatus includes a sending unit and a receiving unit.

The sending unit is configured to send a first information header used for requesting to obtain a key to a server, wherein the key is a key used by the client to encrypt data obtained by the client, and the first information header is obtained by the server after encrypting the key using a first encryption algorithm.

The receiving unit is configured to obtain a second information header and the key from the server, and the second information header is obtained by the server after encrypting the key based on a second encryption algorithm.

In implementations, the apparatus further includes a determining unit.

The determining unit is configured to determine whether an information header is stored locally, send a key acquisition request to the server if not stored, obtain the first information header and the key from the server, and store the first information header locally.

In implementations, the determining unit is further configured to: use the stored information header as the first information header if the information header is stored, and trigger the sending unit.

In implementations, the receiving unit is further configured to store the second information header locally and delete the first information header locally.

In implementations, the first encryption algorithm is different from the second encryption algorithm.

In implementations, the receiving unit is further configured to store the key in a memory.

In implementations, the present disclosure provides a key encryption method, where the method includes:

a server obtaining a first information header used for requesting to obtain a key from a client, wherein the key is a key used by the client to encrypt data obtain by the client, where the first information header is obtained by the server after encrypting the key using a first encryption algorithm;

the server restoring the key from the first information header based on the first encryption algorithm;

the server encrypting the key based on a second encryption algorithm to obtain a second information header; and the server sending the second information header and the key to the client.

In implementations, the first information header further includes an identifier of the first encryption algorithm, wherein: before the server restoring the key from the first information header based on the first encryption algorithm, the method further includes:

the server searching for the first encryption algorithm according to the identifier of the first encryption algorithm.

In implementations, before the server obtaining the first information header used for requesting to obtain the key from the client, the method further includes:

the server obtaining a key acquisition request sent by the client;

the server using a randomly generated key string as the key;

the server encrypting the key using the first encryption algorithm to obtain the first information header; and the server sending the first information header and the key to the client.

In implementations, the first encryption algorithm is different from the second encryption algorithm.

In implementations, the present disclosure provides a key encryption apparatus, wherein the apparatus includes an obtaining unit, a restoring unit, a generating unit, and a sending unit.

The obtaining unit is configured to obtain a first information header used for requesting to obtain a key from a client, wherein the key is a key used by the client to encrypt data obtain by the client, where the first information header is obtained by the server after encrypting the key using a first encryption algorithm.

The restoring unit is configured to restore the key from the first information header based on the first encryption algorithm.

The generating unit is configured to encrypt the key based on a second encryption algorithm to obtain a second information header.

The sending unit is configured to send the second information header and the key to the client.

In implementations, the first information header further includes an identifier of the first encryption algorithm, wherein the restoring unit is further configured to search for the first encryption algorithm according to the identifier of the first encryption algorithm.

In implementations, the obtaining unit is further configured to obtain a key acquisition request sent by the client, use a randomly generated key string as the key, and encrypt the key using the first encryption algorithm to obtain the first information header, and send the first information header and the key to the client.

In implementations, the first encryption algorithm is different from the second encryption algorithm.

As can be seen from the above technical solutions, a client does not store an encryption algorithm used for encrypting a key, but only stores an information header encrypted by the encryption algorithm, so that an attacker cannot directly obtain the encryption algorithm that is used for decrypting the information header even if the client is attacked, thus improving the security of the key in the client. When the key is needed to be used to encrypt obtained data, the client can use the stored first information header to request the key from the server, and the server having a higher security restores the key based on a stored first encryption algorithm. The client can encrypt the data using the key obtained from the server, so that the client can ensure the security of the obtained data without storing the encryption algorithm.

BRIEF DESCRIPTION OF THE DRAWINGS

In order to more clearly illustrate the technical solutions of the embodiments of the present disclosure, accompanying drawings that are needed for describing the embodiments are briefly described below. Apparently, the described drawings merely represent some embodiments of the present disclosure. One of ordinary skill in the art can obtain other drawings based on these drawings without making any inventive effort.

DETAILED DESCRIPTION

In order to enable a clear understanding of the purposes, technical solutions and advantages of the embodiments of the present disclosure, the technical solutions in the embodiments of the present disclosure are clearly described hereinafter with reference to the accompanying drawings in the embodiments of the present disclosure. Apparently, the described embodiments represent some and not all of the embodiments of the present disclosure. All other embodiments obtained by one of ordinary skill the art based on the embodiments of the present disclosure without making any inventive effort shall fall within the scope of protection of the present disclosure.

In the era of big data, data security has received an increasing amount of attention from people. In order to ensure the security of data on a client, the client often encrypts and then store data that is obtained. After data is encrypted by a key, the security of the data is improved. However, once the key is illegally obtained by an attacker, the attacker can obtain the data based on the obtained key. Therefore, the security of the key is needed to be guaranteed for security of the data. In conventional methods, a client's key is generated by the client itself. To improve the security of the key, the client generally encrypts the key and stores thereof locally on the client through an encryption algorithm. When the key is needed, the key can be restored from the encrypted key according to a locally stored encryption algorithm.

Since the encryption algorithm is stored locally on the client, it is easily obtained by an attacker. As such, the key can be restored using the encryption algorithm, and encrypted data stored in the client is cracked using the key, thus leading to a leakage of data of the client, and causing serious consequences because the data may involve important information such as privacy. For example, a data breach in a company can lead to a decline in the prestige and trust of the company in the public, and even a serious blow to the economic interests of the company.

In response to the above problems, the embodiments of the present disclosure provide key encryption methods, apparatuses, and systems. A client only store an information header encrypted by an encryption algorithm, and the encryption algorithm is stored in a server with a higher security. When the client needs to use the key, the client sends the information header for requesting to obtain the key, obtains the key, and thereby processes data, which fully ensures the security of the client's data.

Figure 1:
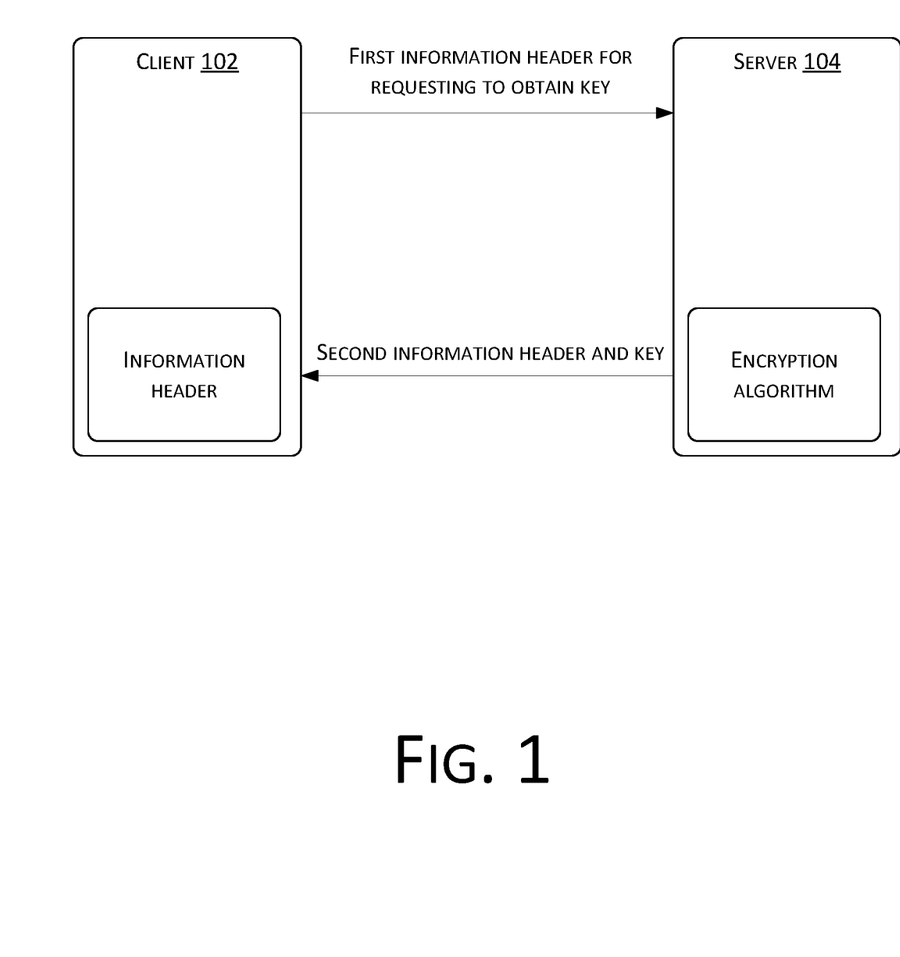
FIG. 1 is a schematic system diagram of key encryption according to the embodiments of the present disclosure.

Based on the above basic ideas, the embodiments of the present disclosure are mainly implemented through interactions between a client and a server. As shown in FIG. 1, a client 102 locally stores an information header obtained by encrypting a key, and a server 104 stores a corresponding encryption algorithm. When the client 102 needs to encrypt data obtained thereby according to the key, the key can be obtained by sending a first information header for requesting to obtain the key to the server 104.

The data obtained by the client 102 may be data generated by the client 102 itself. For example, a user logs in an instant communication application (such as WangWang) through the client, and a chat record that is generated therefor is data generated by the client itself. The data obtained by the client 102 may also be data received externally by other means, for example, a user receives data sent by a server through the client. The data often involves important information, and the data can be encrypted using a key and then stored thereof in the client locally to ensure the security of the data.

The key can be an encryption parameter used in a process of encrypting data into a ciphertext or restoring data from a ciphertext. For example, a user can use the client 102 to encrypt obtained data {A1, A2, A3} into a ciphertext {B1, B2, B3} using a key and store thereof. When the user needs to read the data, the stored ciphertext {B1, B2, B3} can be decrypted into the data {A1, A2, A3} by the client 102 using the key.

The encryption algorithm is an algorithm for encrypting a key. In addition to being used to encrypt a key to obtain an information header, the encryption algorithm can also be used to decrypt an information header to restore a key. In the present disclosure, the encryption algorithm is stored in the server 104 which is more secure than the client 102.

The encryption algorithm stored by the server may include a first encryption algorithm and a second encryption algorithm. The server 104 may encrypt the key using the second encryption algorithm to obtain a second information header, and send the second information header and the key to the client 102.

The information header is an information header obtained by encrypting the key using the encryption algorithm, and can be stored locally in the client 102. The information header includes information obtained after encrypting the key, and may also include encrypted information such as a user name. In other words, an encryption algorithm may be used to encrypt information such as a key and a user name to obtain an information header.

For the above scenario, a specific example is used for description. For example, when a user logs into an instant communication application (such as WangWang) through a client, the client sends a locally stored information header 1 to a server for requesting to obtain a key. The server finds a corresponding encryption algorithm 1 according to the received information header 1, restores the key from the information header 1, uses an encryption algorithm 2 to encrypt the key to generate an information header 2, and sends the information header 2 and the key to the client through a secure channel. The client may encrypt data according to the obtained key, and store an encrypted ciphertext locally in the client, or decrypt encrypted data according to the obtained key, and display the decrypted data.

A key encryption method 200 provided by the embodiments of the present disclosure will be described hereinafter with reference to FIG. 2.

Figure 2:
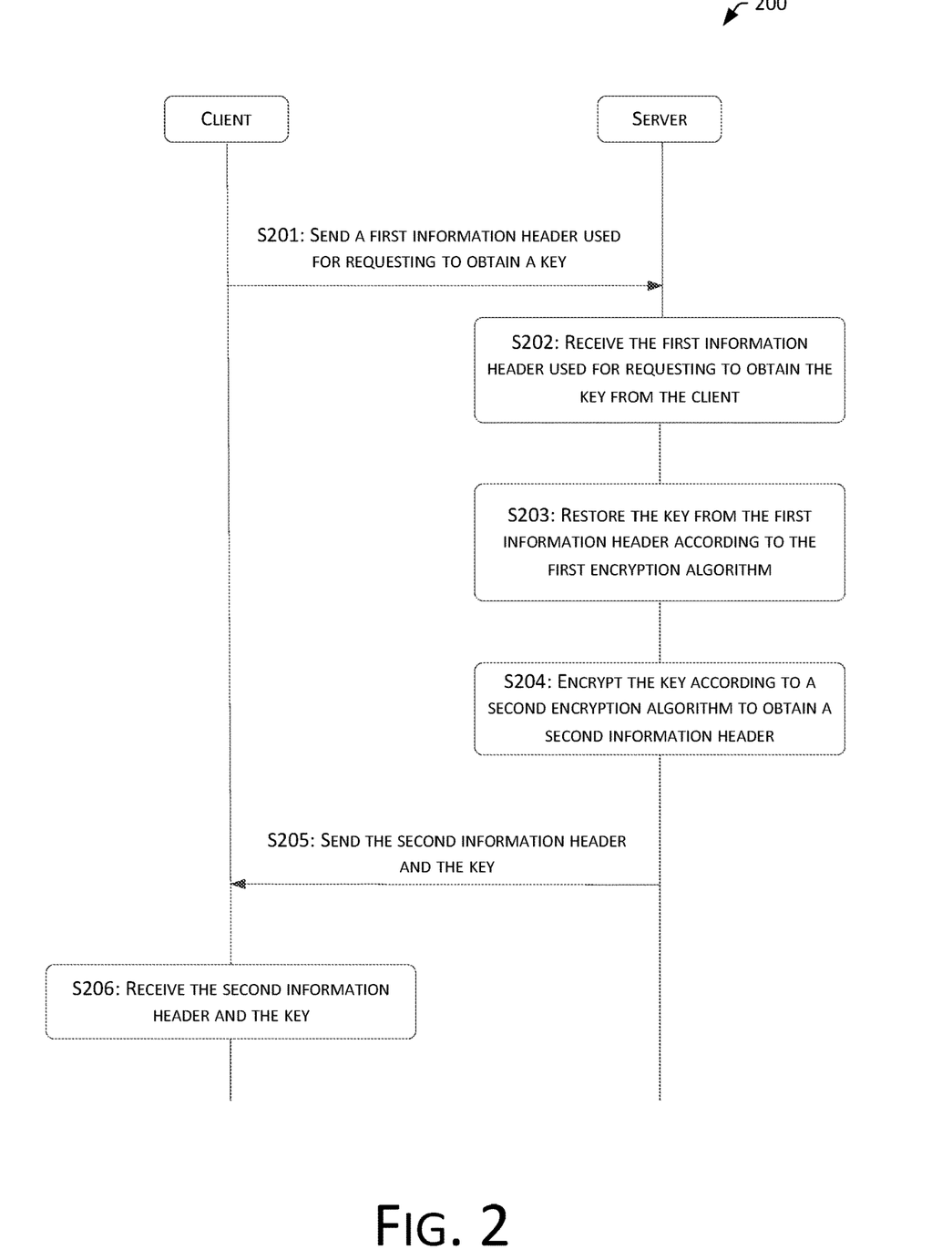
FIG. 2 is a flowchart of a key encryption method according to the embodiments of the present disclosure.

FIG. 2 is a flowchart of a key encryption method provided by the embodiments of the present disclosure. The method 200 may include the following operations.

S201: A client sends a first information header used for requesting to obtain a key to a server, wherein the key is a key used by the client to encrypt data obtained by the client, and the first information header is obtained by the server after encrypting the key using a first encryption algorithm.

In the embodiments of the present disclosure, when the client needs to perform encryption processing on obtained data or decrypt encrypted data, the client can use a key obtain from the server. In order to avoid persistent key loss, the client generally caches the key in a memory and does not store the key in a persistent storage area such as a hard disk. When the client obtains data, the key can be retrieved from the memory to encrypt the data.

Because the key cached in the memory is easy to be deleted, for example, in cases of memory update and client restart. Therefore, if the client does not find the key that is needed from the memory, the client needs to obtain the key from the server again. In the present disclosure, since the first encryption algorithm is stored in the server, the server can restore the key from the first information header according to the first encryption algorithm. Therefore, the client can use the first information header that is locally stored as a basis for obtaining the key. The first information header is obtained by encrypting the key using the first encryption algorithm. The first information header, even if obtained by a third party, is more difficult to be illegally decrypted. Therefore, the client can generally store the first information header in a persistent storage area.

S202: The server receives the first information header for requesting to obtain the key from the client.

S203: The server restores the key from the first information header according to the first encryption algorithm.

The server stores respective encryption algorithms for generating information headers. For keys of different clients, the server may use different encryption algorithms for encryption, or may use a same encryption algorithm for encryption. Therefore, when the server obtains the first information header of the client, the first encryption algorithm used for encrypting the first information header may be determined first, and then the first encryption algorithm is used to restore the key from the first information header.

For example, the server searches for a corresponding encryption algorithm 1 from stored encryption algorithms according to an obtained information header 1, and uses the encryption algorithm 1 to restore a key from the information header 1.

In order to facilitate the server to quickly find the first encryption algorithm corresponding to the first information header, the server may include an identifier of the first encryption algorithm in the first information header when generating the first information header using the first encryption algorithm. Specifically, before the server restores the key from the first information header according to the first encryption algorithm, the method includes:

the server searching for the first encryption algorithm according to the identifier of the first encryption algorithm.

For example, an identifier of an encryption algorithm may be used to identify the encryption algorithm. Specifically, an identifier of an encryption algorithm may be used to indicate a type of the encryption algorithm that is identified, or may be used to indicate version information of the encryption algorithm that is identified, or may be used to indicate both the type and the version information of the encryption algorithm that is identified. For example, when an identifier is version information of an encryption algorithm, the server encrypts a key using an encryption algorithm of an encryption algorithm version V1.0, and generates an information header including encrypted key information and the version of the encryption algorithm {"EncryptedData": qbduada1232j adfijijiafadfasdfa7667766adfds67767sf667sdfhhffs", "EncryptVersion": "1.0"}, where "EncryptedData" is used to indicate the encrypted key, and "EncryptVersion" is used to indicate that the version information of the encryption algorithm is "1.0".

It should be noted that including an identifier of a corresponding encryption algorithm in an information header is an exemplary manner for facilitate the server to search for the encryption algorithm. An absence of the identifier does not affect a smooth search for the encryption algorithm by the server.

S204: The server encrypts the key according to a second encryption algorithm to obtain a second information header.

After restoring the key needed by the client, the server can encrypt the key using an encryption algorithm before the key is sent to the client, and then send a second information header obtained after encryption and the key together to the client. When the client needs to obtain the key from the server again, the second information header can be used to request an acquisition of the key.

In exemplary scenarios, the second encryption algorithm used in this operation may be the same as the first encryption algorithm that is used in encryption for obtaining the first information header. For example, the first encryption algorithm is algorithm A. When the server receives the first information header used for requesting to obtain the key from the client, the server can still use the algorithm A to encrypt the key if the server can be clear that the algorithm A still has a relatively high security. In other words, the second encryption algorithm can still be the algorithm A, i.e., the second encryption algorithm is the same as the first encryption algorithm. Correspondingly, the second information header obtained by the second encryption algorithm may also be the same as the first information header.

In some scenarios, the second encryption algorithm and the first encryption algorithm may also be different. For example, the first encryption algorithm is an algorithm A. When or before the server receives the first information header used for requesting to obtain the key from the client, the server detects that the algorithm A may have been obtained or cracked by an attacker. In this case, the security of the key is reduced if the algorithm A is continued to be used. In this situation, the server can no longer use the algorithm A, and use an algorithm B as the second encryption algorithm to encrypt the key to ensure the security of the key. The algorithm B may be an encryption algorithm of a type different from that of the algorithm A. The algorithm B may also be an improved version based on the algorithm A. For example the algorithm A is version 1 of an encryption algorithm and the algorithm B may be version 2 of this encryption algorithm.

In addition to using a second encryption algorithm that is different from the first encryption algorithm in a scenario when the server detects a potential leak of the algorithm A, the server may also employ a way of periodically changing encryption algorithms. For example, the server may change an encryption algorithm once in every fixed period of time. The first encryption algorithm may be an encryption algorithm used in a fixed period of time, and the second encryption algorithm may be an encryption algorithm used in another fixed period of time. In this case, the second encryption algorithm may also be a different type of encryption algorithm than the first encryption algorithm, or may be an improved version based on the first encryption algorithm.

S205: The server sends the second information header and the key to the client.

The server sends the key restored at S203, and the second information header obtained by encrypting the key using the second encryption algorithm at S204 to the client.

The server can send the above information to the client in multiple ways. After the server restores the key and obtains the second information header, the server can directly send the information to the client. Alternatively, the client may send a request message to the server, and the server sends the second information header and the key to the client after receiving the request message. The embodiments of the present disclosure do not impose any limitations on the ways of sending this information.

S206: The client receives the second information header and the key from the server, wherein the second information header is obtained by the server after encrypting the key according to the second encryption algorithm.

The client stored the obtained second information header locally in the client, so that when the client needs to obtain the key again from the server, the stored second information header can be used to request an acquisition of the key.

In order to avoid a leakage of the key caused by a persistent storage of the key, the client generally caches the key in a memory. When the client obtains data, the key can be retrieved from the memory to encrypt the data. In order to further improve the security of the key, when the client completes an encryption of the data, the key can be deleted from the memory of the client.

Considering that newly obtained data may need to be encrypted in a short time interval after encryption of current data is completed, the client needs to obtain the key again when the newly obtained data needs to be encrypted, if the key is deleted after the current data is encrypted.

In view of the above situation, the key stored in the memory of the client can be time-limited. A time period can be set, and the current data is processed by the client. After the set time period is over, the key is removed from the memory of the client if no new data needs to be encrypted. For example, the client stores the obtained key in the memory, and uses the key to encrypt data {A1, A2, A3}. After processing thereof is completed, 10 seconds is waited. If no new data is to be processed within these 10 seconds, the key is deleted.

Similarly, when the client needs to decrypt data, the obtained key can also be stored in the memory, and a time period is set. After the set time period is over, if no data is to be decrypted, the key is deleted from the memory of the client.

The time period may be set by the client in advance, or may be set when the client needs to process data, which is not limited in the embodiments of the present disclosure. The length of the set time period can be selected according to the security of an actual operation, and no limitations are imposed thereon.

By storing the obtained key in the memory of the client and setting the time period to limit a storage time of the key, the workloads of the client and the server are reduced, and the work efficiency of data encryption or decryption is fully improved, under a premise that the security of the key is guaranteed.

In addition, during a time period that the key is stored in the memory of the client, the client can directly delete the stored key to ensure the security of data if the client detects an abnormal situation, for example, the client is illegally attacked.

At S206, the client stores the received second information header locally. When the client needs to obtain the key again from the server, the second information header may be used to request for an acquisition of the key. However, since the client locally stores the first information header, this may cause confusion when the client sends an information header for requesting to obtain the key. For example, the client may still use the first information header and send a request for obtaining the key to the server.

In order to avoid the above problem, after the client obtains the second information header and the key from the server, the client may store the second information header locally and delete the first information header locally. For example, the client locally stores the information header 1 that is obtained after encrypting the key using the encryption algorithm A. When the server sends the information header 2 that is obtained after encrypting the key using the encryption algorithm B to the client, the client can delete the information header 1 locally, and store the information header 2 locally. This makes the client only store a information header that is most recently received, thus improving security.

After obtaining the second information header, the client stores the second information header and deletes the first information header. As such, the client can directly send a request for obtaining the key using the locally stored second information header.

As can be seen from above, in the key encryption method provided by the present embodiment, a client does not store an encryption algorithm used for encrypting a key, but only stores an information header encrypted by the encryption algorithm, so that an attacker cannot directly obtain the encryption algorithm that is used for decrypting the information header even if the client is attacked, thus improving the security of the key in the client. When the key is needed to be used to encrypt obtained data, the client can use the stored first information header to request the key from the server, and the server having a higher security restores the key based on a stored first encryption algorithm. The client can encrypt the data using the key obtained from the server, so that the client can ensure the security of the obtained data without storing the encryption algorithm.

Figure 3:
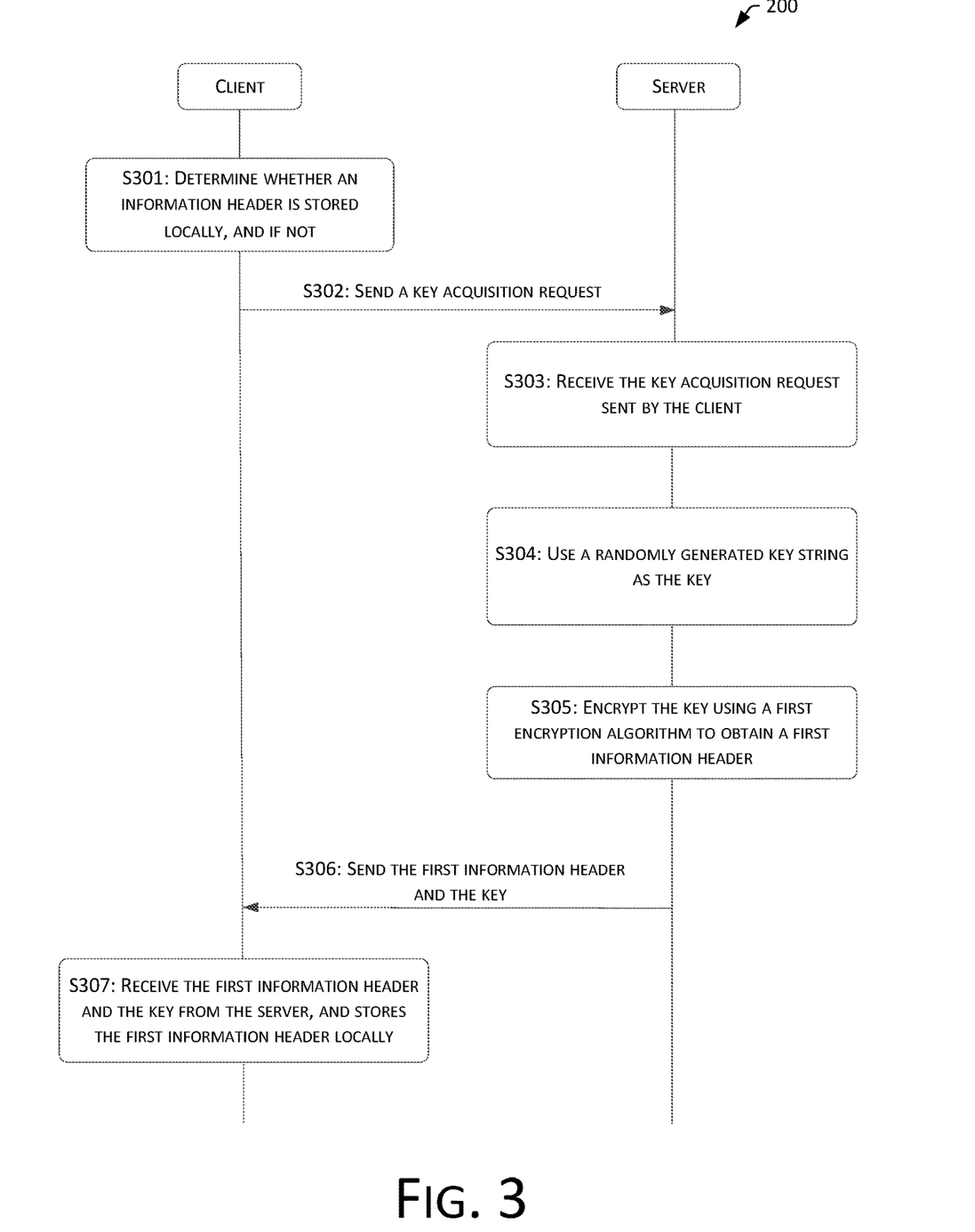
FIG. 3 is a flowchart of another key encryption method according to the embodiments of the present disclosure.

For the foregoing embodiments, before the client requests to obtain a key by sending an information header to the server, the client may have stored the information header locally. In that case, the above operations can be directly performed. Alternatively, the information header may not be stored in the client locally, and the information header is needed to be obtained from the server first before the above operations are performed. Therefore, a determination of whether the information header is locally stored in the client may also be added before S201. As shown in FIG. 3, before the client sends the first information header used for requesting to obtain the key to the server, the method 200 may further include the following operations.

S301: The client determines whether an information header is stored locally, and the process proceeds to S302 if not.

Before the client sends an information header to request for obtaining a key, a determination may first be made as to whether the information header is locally stored in the client. If not stored, the information header is needed to be obtained. If the information header is stored, the stored information header can be used as the first information header, and the operation of sending the first information header used for requesting to obtain the key to the server is performed.

A number of reasons why the information header is not locally stored in the client exist. The client may need to perform an encryption operation on data for the first time, and has not requested to obtain a key before. Therefore, an information header corresponding to the key is not stored in the client locally. Also, the information header that is locally stored in the client may have been deleted due to reasons such as deletion by mistake or the like, and thus the locally stored information header is lost.

S302: The client sends a key acquisition request to the server.

When the information header is not stored in the client, no information header can be sent to obtain the key. In this case, when the client needs to obtain the key, the client can send a key acquisition request to the server.

S303: The server receives the key acquisition request sent by the client.

S304: The server uses a randomly generated key string as the key.

In the present disclosure, a key used by the client can be generated by the server. The server can generate a corresponding key for an individual client, or assign one generated key to multiple clients. In order to improve the difficulty of cracking a key, the server can randomly generate a string of characters as the key. For example, the server can randomly combine the numbers (0-9), the letters (AZ), and the symbol "-" to produce a key string 344A2F6F-DB62-DE45-BEF1-4A49E89FB7CE is used as a key.

A random generation of a key string improves the complexity of cracking a key and further ensures the security of the key.

It should be noted that randomly generating a key is an exemplary method, and the method of generating a key is not limited in the embodiments of the present disclosure.

S305: The server encrypts the key using a first encryption algorithm to obtain a first information header.

In order to facilitate the server to quickly find the first encryption algorithm corresponding to the first information header in subsequent operations, the server may include an identifier of the first encryption algorithm in the first information header when the first information header is obtained. This operation is similar to S203 in which an identifier of an encryption algorithm is included in an information header, and details thereof are not repeatedly described herein.

S306: The server sends the first information header and the key to the client.

The server can send the information header and the key to the client through a secure channel. A sending method is similar to the method of sending a key and an information header to the client by the server at S205, and details thereof are not repeatedly described herein.

S307: The client receives the first information header and the key from the server, and stores the first information header locally.

The client stores the received information header locally in the client, so that the information header for requesting to obtain the key can be directly sent to the server next time when the key needs to be obtained, and the operations of S301-S307 are not needed to be performed again, thus improving the work efficiency of key encryption.

The client stores the obtained key in the memory, and this operation is similar to storing the obtained key at S206, and details thereof are not repeatedly described herein.

Figure 4:
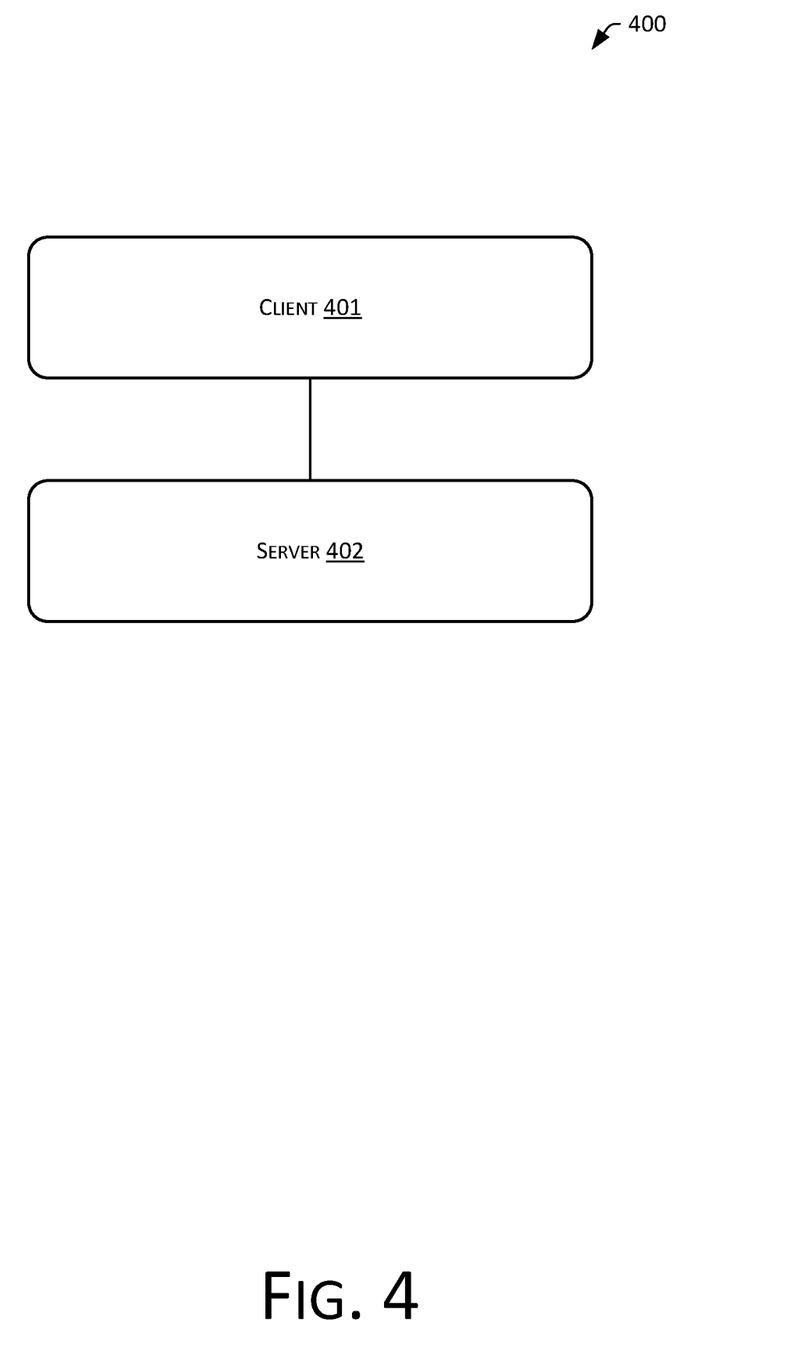
FIG. 4 is a structural system diagram of a key encryption system according to the embodiments of the present disclosure.

FIG. 4 is a structural system diagram of a key encryption system 400 according to the embodiments of the present disclosure. The system includes a client 401 and a server 402.

The client 401 is configured to send a first information header used for requesting to obtain a key to the server, wherein the key is a key used by the client to encrypt data obtained by the client, the first information, and the first information header is obtained by the server after encrypting the key using a first encryption algorithm; and obtain a second information header and the key from the server, wherein the second information header is obtained by the server after encrypting the key based on a second encryption algorithm.

The server 402 is configured to obtain the first information header used for requesting to obtain the key from the client; restore the key from the first information header based on the first encryption algorithm; encrypting the key based on the second encryption algorithm to obtain the second information header; and transmitting the second information header and the key to the client.

It should be noted that features in corresponding embodiments in FIG. 4 can be referenced to related descriptions of related features in corresponding embodiments in FIGS. 1-3, and details thereof are not repeatedly described herein.

As can be seen, a client does not store an encryption algorithm used for encrypting a key, but only stores an information header encrypted by the encryption algorithm, so that an attacker cannot directly obtain the encryption algorithm that is used for decrypting the information header even if the client is attacked, thus improving the security of the key in the client. When the key is needed to be used to encrypt obtained data, the client can use the stored first information header to request the key from the server, and the server having a higher security restores the key based on a stored first encryption algorithm. The client can encrypt the data using the key obtained from the server, so that the client can ensure the security of the obtained data without storing the encryption algorithm.

Figure 5:
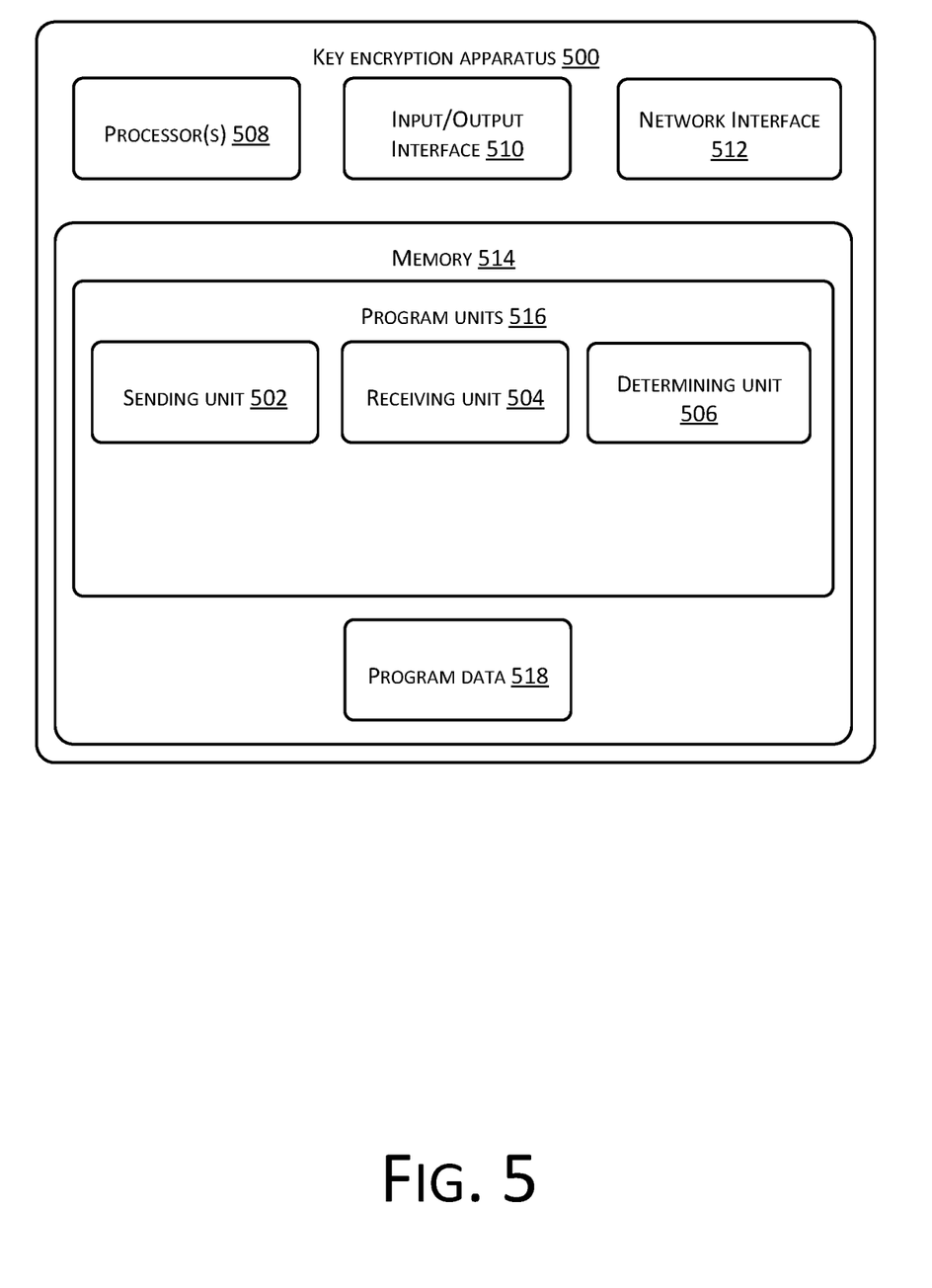
FIG. 5 is a structural apparatus diagram of a key encryption apparatus according to the embodiments of the present disclosure.

FIG. 5 is a structural apparatus diagram of a key encryption apparatus 500 according to the embodiments of the present disclosure. In implementations, the apparatus 500 may include one or more computing devices, or may be included in one or more computing devices such as a part of the one or more computing devices. In some implementations, the apparatus 500 may include a client such as the client 102 as described in the foregoing description. In other implementations, the apparatus 500 may be included in a client such as the client 102. In implementations, the apparatus 500 may include a sending unit 501 and a receiving unit 502.

The sending unit 501 is configured to send a first information header used for requesting to obtain a key to a server, wherein the key is a key used by the client to encrypt data obtained by the client, and the first information header is obtained by the server after encrypting the key using a first encryption algorithm;

The receiving unit 502 is configured to obtain a second information header and the key from the server, and the second information header is obtained by the server after encrypting the key based on a second encryption algorithm.

In implementations, the apparatus further includes a determining unit 506.

The determining unit 506 is configured to determine whether the information header is stored locally, send a key acquisition request to the server if not stored, obtain the first information header and the key from the server, and store the first information header locally.

In implementations, the determining unit 506 is further configured to: use the stored information header as the first information header if the information header is stored, and trigger the sending unit.

In implementations, the receiving unit 502 is further configured to store the second information header locally and delete the first information header locally.

In implementations, the first encryption algorithm is different from the second encryption algorithm.

In implementations, the receiving unit 502 is further configured to store the key in a memory.

In implementations, the apparatus 500 may further include one or more processors 508, an input/output (I/O) interface 510, a network interface 512, and a memory 514.

The memory 514 may include a form of computer readable media such as a volatile memory, a random access memory (RAM) and/or a non-volatile memory, for example, a read-only memory (ROM) or a flash RAM. The memory 514 is an example of a processor readable media.

The computer readable media may include a volatile or non-volatile type, a removable or non-removable media, which may achieve storage of information using any method or technology. The information may include a computer-readable instruction, a data structure, a program module or other data. Examples of processor storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the memory 514 may include program units 516 and program data 518. The program units 516 may include one or more modules as described in the foregoing description and shown in FIG. 5.

It should be noted that features in corresponding embodiments in FIG. 5 can be referenced to related descriptions of related features in corresponding embodiments in FIGS. 1-3, and details thereof are not repeatedly described herein.

As can be seen, a client does not store an encryption algorithm used for encrypting a key, but only stores an information header encrypted by the encryption algorithm, so that an attacker cannot directly obtain the encryption algorithm that is used for decrypting the information header even if the client is attacked, thus improving the security of the key in the client. When the key is needed to be used to encrypt obtained data, the client can use the stored first information header to request the key from the server, and the server having a higher security restores the key based on a stored first encryption algorithm. The client can encrypt the data using the key obtained from the server, so that the client can ensure the security of the obtained data without storing the encryption algorithm.

Figure 6:
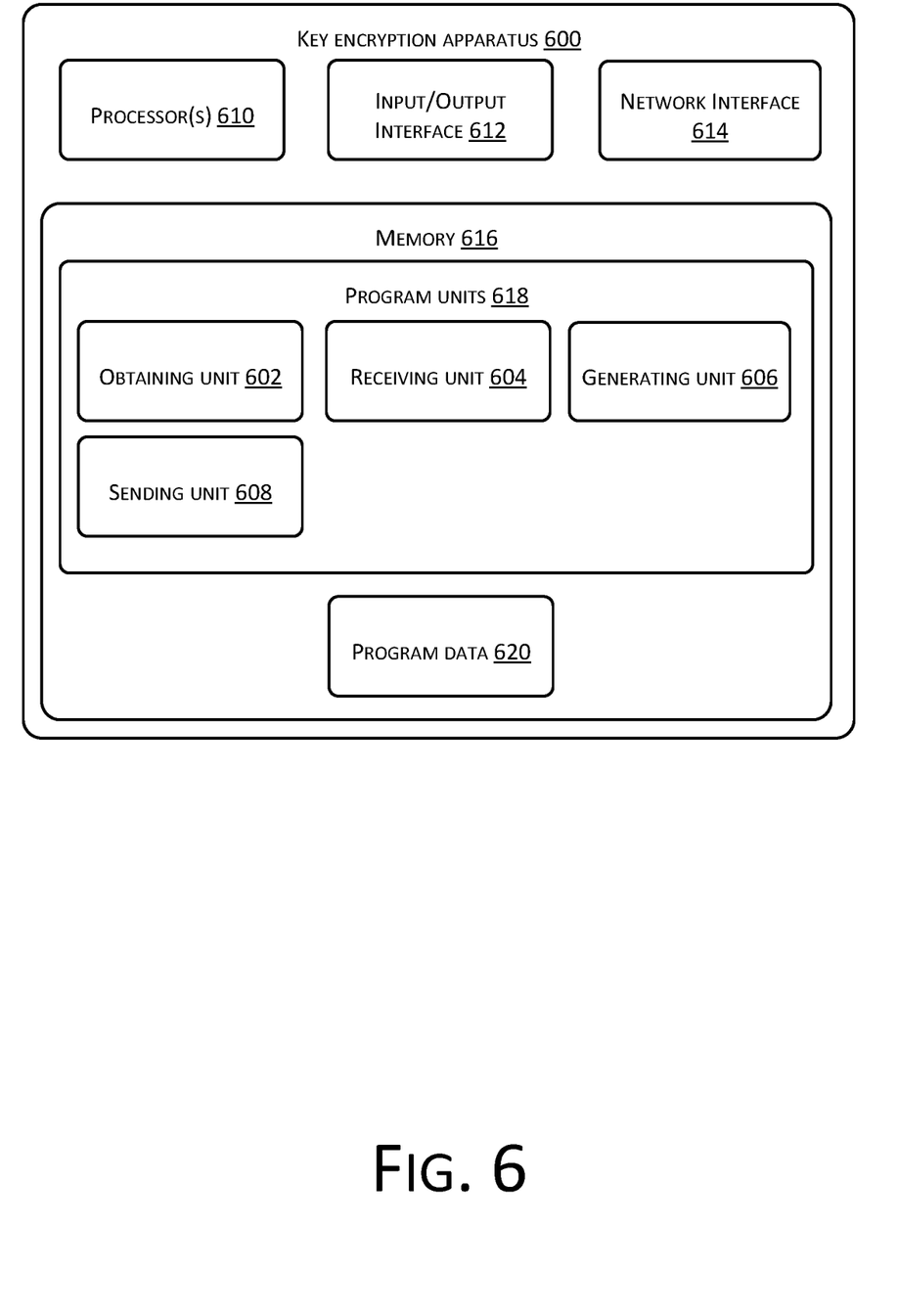
FIG. 6 is a structural apparatus diagram of a key encryption apparatus according to the embodiments of the present disclosure.

FIG. 6 is a structural apparatus diagram of a key encryption apparatus 600 according to the embodiments of the present disclosure. In implementations, the apparatus 600 may include one or more computing devices, or may be included in one or more computing devices such as a part of the one or more computing devices. In some implementations, the apparatus 600 may include a server such as the server 104 as described in the foregoing description. In other implementations, the apparatus 600 may be included in a server such as the server 104. In implementations, the apparatus 600 may include an obtaining unit 602, a restoring unit 604, a generating unit 606, and a sending unit 608.

The obtaining unit 602 is configured to obtain a first information header used for requesting to obtain a key from a client, wherein the key is a key used by the client to encrypt data obtain by the client, where the first information header is obtained by the server after encrypting the key using a first encryption algorithm.

The restoring unit 604 is configured to restore the key from the first information header based on the first encryption algorithm.

The generating unit 606 is configured to encrypt the key based on a second encryption algorithm to obtain a second information header.

The sending unit 608 is configured to send the second information header and the key to the client.

In implementations, the first information header further includes an identifier of the first encryption algorithm, wherein the restoring unit is further configured to search for the first encryption algorithm according to the identifier of the first encryption algorithm.

In implementations, the obtaining unit is further configured to obtain a key acquisition request sent by the client, use a randomly generated key string as the key, and encrypt the key using the first encryption algorithm to obtain the first information header, and send the first information header and the key to the client.

In implementations, the first encryption algorithm is different from the second encryption algorithm.

In implementations, the apparatus 600 may further include one or more processors 610, an input/output (I/O) interface 612, a network interface 614, and a memory 616.

The memory 616 may include a form of computer readable media such as a volatile memory, a random access memory (RAM) and/or a non-volatile memory, for example, a read-only memory (ROM) or a flash RAM. The memory 616 is an example of a processor readable media as described in the foregoing description.

In implementations, the memory 616 may include program units 618 and program data 620. The program units 618 may include one or more modules as described in the foregoing description and shown in FIG. 6.

It should be noted that features in corresponding embodiments in FIG. 6 can be referenced to related descriptions of related features in corresponding embodiments in FIGS. 1-3, and details thereof are not repeatedly described herein.

As can be seen, a client does not store an encryption algorithm used for encrypting a key, but only stores an information header encrypted by the encryption algorithm, so that an attacker cannot directly obtain the encryption algorithm that is used for decrypting the information header even if the client is attacked, thus improving the security of the key in the client. When the key is needed to be used to encrypt obtained data, the client can use the stored first information header to request the key from the server, and the server having a higher security restores the key based on a stored first encryption algorithm. The client can encrypt the data using the key obtained from the server, so that the client can ensure the security of the obtained data without storing the encryption algorithm.

One of ordinary skill in the art can understand that all or part of the operations of the foregoing method embodiments can be implemented by a program instructing related hardware. The program may be stored in a computer readable storage medium. The program, when executed, performs operations of the foregoing method embodiments. The storage medium may be at least one of the following: various types of media capable of storing program codes, such as a read-only memory (English: read-only memory, abbreviation: ROM), a RAM, a magnetic disk, or an optical disk, etc.

It is noted that various embodiments in the present specification are described in a progressive manner, and same and similar parts between the embodiments may be referenced to each other. Each embodiment focuses on aspects that are different from those of other embodiments. In particular, due to their basic similarities to the method embodiments, the description of the apparatus and system embodiments is relatively simple. Relevant parts can be referenced to the description of corresponding parts of the method embodiments. The apparatus and system embodiments described above are merely illustrative. The units illustrated as separate components may or may not be physically separate. The components displayed as units may or may not be physical units, i.e., may be located in a single place, or may be distributed among multiple network units. Some or all of the modules may be selected according to actual needs to achieve the purposes of the solutions of the embodiments. One of ordinary skill in the art can understand and implement without making any inventive effort.

The above describes only exemplary embodiments of the present disclosure, but the scope of protection of the present disclosure is not limited thereto. Changes or alternatives that can be thought of by one skilled in the art within the technical scope disclosed by the present disclosure shall be covered by the scope of protection of the present disclosure. Therefore, the scope of protection of the present disclosure should be determined by the scope of the appended claims.

The present disclosure can be further understood using the following clauses.

Clause 1: A key encryption system comprising: a client; and a server, wherein: the client is configured to send a first information header used for requesting to obtain a key to the server, wherein the key is restored by the server from the first information header according to a first encryption algorithm; and receive a second information header and the key from the server, wherein the second information header is obtained by the server after encrypting the key based on a second encryption algorithm; and the server is configured to obtain the first information header used for requesting to obtain the key from the client; restore the key from the first information header based on the first encryption algorithm; encrypt the key based on the second encryption algorithm to obtain the second information header; and transmit the second information header and the key to the client.

Clause 2: A key encryption method comprising: a client sending a first information header used for requesting to obtain a key to a server, wherein the key is restored by the server from the first information header according to a first encryption algorithm; and the client receiving a second information header and the key from the server, and the second information header is obtained by the server after encrypting the key based on a second encryption algorithm.

Clause 3: The method of Clause 2, wherein: before the client sending the first information header used for requesting to obtain the key to the server, the method further comprising: the client determining whether an information header is stored locally; the client sending a key acquisition request to the server if not stored; the client obtaining the first information header and the key from the server; and the client storing the first information header locally.

Clause 4: The method of Clause 3, wherein the client determining whether the information header is stored locally comprises: if the information header is stored, the client using the stored information header as the first information header, and performing an operation of sending the first information header used for requesting to obtain the key to the server.

Clause 5: The method of Clause 2, wherein: after the client receives the second information header and the key from the server, the method further comprises: the client storing the second information header locally and deleting the first information header locally.

Clause 6: The method of any one of Clauses 2-5, wherein the first encryption algorithm is different from the second encryption algorithm.

Clause 7: The method of any one of Clauses 2-5, further comprising: the client storing the key in a memory.

Clause 8: A key encryption apparatus comprising: a sending unit; and a receiving unit, wherein: the sending unit is configured to send a first information header used for requesting to obtain a key to a server, wherein the key is restored by the server from the first information header according to a first encryption algorithm; and the receiving unit is configured to obtain a second information header and the key from the server, and the second information header is obtained by the server after encrypting the key based on a second encryption algorithm.

Clause 9: The apparatus of Clause 8, further including a determining configured to determine whether an information header is stored locally, send a key acquisition request to the server if not stored, obtain the first information header and the key from the server, and store the first information header locally.

Clause 10: The apparatus of Clause 9, wherein the determining unit is further configured to: use the stored information header as the first information header if the information header is stored, and trigger the sending unit.

Clause 11: The apparatus of Clause 8, wherein the receiving unit is further configured to store the second information header locally and delete the first information header locally.

Clause 12: The apparatus of Clause 8, wherein the first encryption algorithm is different from the second encryption algorithm.

Clause 13: The apparatus of Clause 8, wherein the receiving unit is further configured to store the key in a memory.

Clause 14: A key encryption method comprising: a server obtaining a first information header used for requesting to obtain a key from a client, wherein the key is a key used by the client to encrypt data obtain by the client, where the first information header is obtained by the server after encrypting the key using a first encryption algorithm; the server restoring the key from the first information header based on the first encryption algorithm; the server encrypting the key based on a second encryption algorithm to obtain a second information header; and the server sending the second information header and the key to the client.

Clause 15: The method of Clause 14, wherein the first information header further comprises an identifier of the first encryption algorithm, and before the server restoring the key from the first information header based on the first encryption algorithm, the method further comprises: the server searching for the first encryption algorithm according to the identifier of the first encryption algorithm.

Clause 16: The method of Clause 14, wherein: before the server obtaining the first information header used for requesting to obtain the key from the client, the method further comprises: the server obtaining a key acquisition request sent by the client; the server using a randomly generated key string as the key; the server encrypting the key using the first encryption algorithm to obtain the first information header; and the server sending the first information header and the key to the client.

Clause 17: The method of any one of Clauses 14-16, wherein the first encryption algorithm is different from the second encryption algorithm.

Clause 18: A key encryption apparatus, wherein the apparatus comprises: an obtaining unit, a restoring unit, a generating unit, and a sending unit, wherein: the obtaining unit is configured to obtain a first information header used for requesting to obtain a key from a client, wherein the key is a key used by the client to encrypt data obtain by the client, where the first information header is obtained by the server after encrypting the key using a first encryption algorithm; the restoring unit is configured to restore the key from the first information header based on the first encryption algorithm; the generating unit is configured to encrypt the key based on a second encryption algorithm to obtain a second information header; and the sending unit is configured to send the second information header and the key to the client.

Clause 19: The apparatus of Clause 18, wherein the first information header further includes an identifier of the first encryption algorithm, wherein the restoring unit is further configured to search for the first encryption algorithm according to the identifier of the first encryption algorithm.

Clause 20: The apparatus of Clause 18, wherein the obtaining unit is further configured to obtain a key acquisition request sent by the client, use a randomly generated key string as the key, and encrypt the key using the first encryption algorithm to obtain the first information header, and send the first information header and the key to the client.

Clause 21: The apparatus of Clause 18, wherein the first encryption algorithm is different from the second encryption algorithm.

What is claimed is:

1. A method implemented by one or more processors of a client, the method comprising:
   sending a first information header used for requesting to obtain a key to a server, wherein the key is restored by the server from the first information header according a first encryption algorithm; and
   receiving a second information header and the key from the server, and the second information header is obtained by the server after encrypting the key based on a second encryption algorithm, the first encryption algorithm being different from the second encryption algorithm in response to a determination that the first encryption algorithm is susceptible to a leakage, or after a set period of time.

2. The method of claim 1, wherein: before sending the first information header used for requesting to obtain the key to the server, the method further comprises:
   determining that information header is stored locally.

3. The method of claim 1, wherein: before sending the first information header used for requesting to obtain the key to the server, the method further comprises:
   determining that the first information header is not stored locally;
   sending a key acquisition request to the server;
   obtaining the first information header and the key from the server; and
   storing the first information header locally.

4. The method of claim 1, wherein, the method further comprises:
   using a stored information header as the first information header.

5. The method of claim 1, wherein: after receiving the second information header and the key from the server, the method further comprises:
   storing the second information header locally and deleting the first information header locally.

6. The method of claim 1, further comprising:
   storing the key in a memory.

7. The method of claim 1, wherein the second encryption algorithm is a type different from the first encryption algorithm.

8. The method of claim 1, wherein the second encryption is a type different from the first encryption algorithm.

9. The method of claim 1, wherein the key is a randomly generated key string.

10. The method of claim 1, further comprising caching the key in a memory without storing the key in a persistent storage media.

11. One or more computer readable media storing executable instructions that, when executed by one or more processors of a server, cause the one or more processors to perform acts comprising:
    obtaining a first information header used for requesting to obtain a key from a client;
    restoring the key from the first information header based on a first encryption algorithm;
    using a second encryption algorithm that is different from the first encryption algorithm in response to determining that the first encryption algorithm is susceptible to a leakage, or after a set period of time;
    encrypting the key based on the second encryption algorithm to obtain a second information header; and
    sending the second information header and the key to the client.

12. The one or more computer readable media of claim 11, wherein:
    the first information header further comprises an identifier of the first encryption algorithm; and
    before the server restoring the key from the first information header based on the first encryption algorithm, the acts further comprise searching for the first encryption algorithm according to the identifier of the first encryption algorithm.

13. The one or more computer readable media of claim 11, wherein: before the server obtains the first information header used for requesting to obtain the key from the client, the acts further comprise:
    obtaining a key acquisition request sent by the client;
    using a randomly generated key string as the key;
    encrypting the key using the first encryption algorithm to obtain the first information header; and
    sending the first information header and the key to the client.

14. The one or more computer readable media of claim 11, wherein the second encryption algorithm is an updated version of the first encryption algorithm, or a type different from the first encryption algorithm.

15. A method implemented by one or more processors of a server, the method comprising:
    obtaining a first information header used for requesting to obtain a key from a client;
    restoring the key from the first information header based on a first encryption algorithm;
    using a second encryption algorithm that is different from the first encryption algorithm in response to determining that the first encryption algorithm is susceptible to a leakage, or after a set period of time;
    encrypting the key based on the second encryption algorithm to obtain a second information header; and
    sending the second information header and the key to the client.

16. The method of claim 15, wherein:
    the first information header further comprises an identifier of the first encryption algorithm.

17. The method of claim 16, wherein before the server restores the key from the first information header based on the first encryption algorithm, the method further comprises searching for the first encryption algorithm according to the identifier of the first encryption algorithm.

18. The method of claim 15, wherein: before the obtaining the first information header used for requesting to obtain the key from the client, the method further comprises:
    obtaining a key acquisition request sent by the client;
    using a randomly generated key string as the key;
    encrypting the key using the first encryption algorithm to obtain the first information header; and
    sending the first information header and the key to the client.

19. The method of claim 15, wherein the second encryption algorithm is an updated version of the first encryption algorithm.

20. The method of claim 15, wherein the second encryption is a type different from the first encryption algorithm.

* * * * *